(12) United States Patent
Bertram et al.

(10) Patent No.: US 8,332,368 B2
(45) Date of Patent: Dec. 11, 2012

(54) GENERATING INFORMATION ON APPLICATION TASKS FOR COMPONENT OBJECTS GROUPED IN A COMPOSITE OBJECT

(75) Inventors: Randal Lee Bertram, Raleigh, NC (US); Bridget Marie Meyer, Rochester, MN (US); Jeffery John Van Heuklon, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 663 days.

(21) Appl. No.: 12/208,294

(22) Filed: Sep. 10, 2008

(65) Prior Publication Data
US 2010/0064296 A1  Mar. 11, 2010

(51) Int. Cl.
*G06F 7/00* (2006.01)
(52) U.S. Cl. ......... 707/693; 707/805; 707/962; 715/825
(58) Field of Classification Search .................. None
See application file for complete search history.

(56) References Cited

U.S. PATENT DOCUMENTS

| | | | |
|---|---|---|---|
| 5,481,701 A * | 1/1996 | Chambers, IV ............... | 1/1 |
| 6,055,493 A | 4/2000 | Ries et al. | |
| 6,065,012 A | 5/2000 | Balsara et al. | |
| 6,339,750 B1 | 1/2002 | Hoyer et al. | |
| 6,356,937 B1 * | 3/2002 | Montville et al. ............ | 709/206 |
| 6,463,442 B1 | 10/2002 | Bent et al. | |
| 6,505,244 B1 | 1/2003 | Natarajan et al. | |
| 6,591,311 B1 | 7/2003 | Blech et al. | |
| 6,879,988 B2 * | 4/2005 | Basin et al. ............ | 1/1 |
| 7,107,591 B1 | 9/2006 | Karp et al. | |
| 7,231,439 B1 | 6/2007 | Abbott et al. | |
| 2004/0044753 A1 | 3/2004 | Toyoshima et al. | |
| 2004/0128400 A1 | 7/2004 | Srinivasan et al. | |
| 2005/0108727 A1 | 5/2005 | Bernstein et al. | |
| 2005/0228608 A1 | 10/2005 | Wells | |
| 2006/0143252 A1 * | 6/2006 | Perterson et al. ............ | 707/204 |
| 2007/0050446 A1 | 3/2007 | Moore | |
| 2007/0174366 A1 * | 7/2007 | Palapudi et al. ............ | 707/205 |
| 2007/0185914 A1 * | 8/2007 | Prahlad et al. ............ | 707/200 |

OTHER PUBLICATIONS

ABC Amber Blackberry Converter, (archived by www.archive.org on Sep. 2, 2006, available at http://web.archive.org/web/20060902162007/http://www.processtext.com/abcblackberry.html.).*

* cited by examiner

*Primary Examiner* — Vei-Chung Liang
(74) *Attorney, Agent, or Firm* — David W. Victor; Konrad Raynes and Victor LLP (57) ABSTRACT

Provided are a method, system, and article of manufacture for generating information on application tasks for component objects grouped in a composite object. A composite object in a computer readable medium is comprised of component objects, wherein different application tasks are used to process the component objects. Metadata associates the application tasks for the component objects grouped in the composite object with the composite object. An operation is performed on the composite object by processing the metadata indicating the application tasks for the component objects grouped in the composite object on which the operation is performed.

16 Claims, 7 Drawing Sheets

Composite Object Metadata

Metric Metadata

FIG. 11

GENERATING INFORMATION ON APPLICATION TASKS FOR COMPONENT OBJECTS GROUPED IN A COMPOSITE OBJECT

BACKGROUND OF THE INVENTION

1. Field of the Invention

The present invention relates to a method, system, and article of manufacture for generating information on application tasks for component objects grouped in a composite object.

2. Description of the Related Art

A composite object appears as a single entity and may contain one or more component objects. For example, a ZIP file, which is a file in a lossless data compression and archival format, appears to be a single entity, and can be treated as a single file for file management purposes, but may contain several other objects of different types. The objects in a ZIP file may be diverse in nature or related. When looked at individually, the contained objects could be bound to other related objects or to applications that operate on the component object. For example, a .jpg file (Joint Photographic Experts Group file format), could be bound to other image objects (i.e. other .jpg, .bmp (bitmap) or .gif (Graphics Interchange Format) files), or to tasks (such as a picture viewer, Internet browser, etc.)

Figures 1, 2:
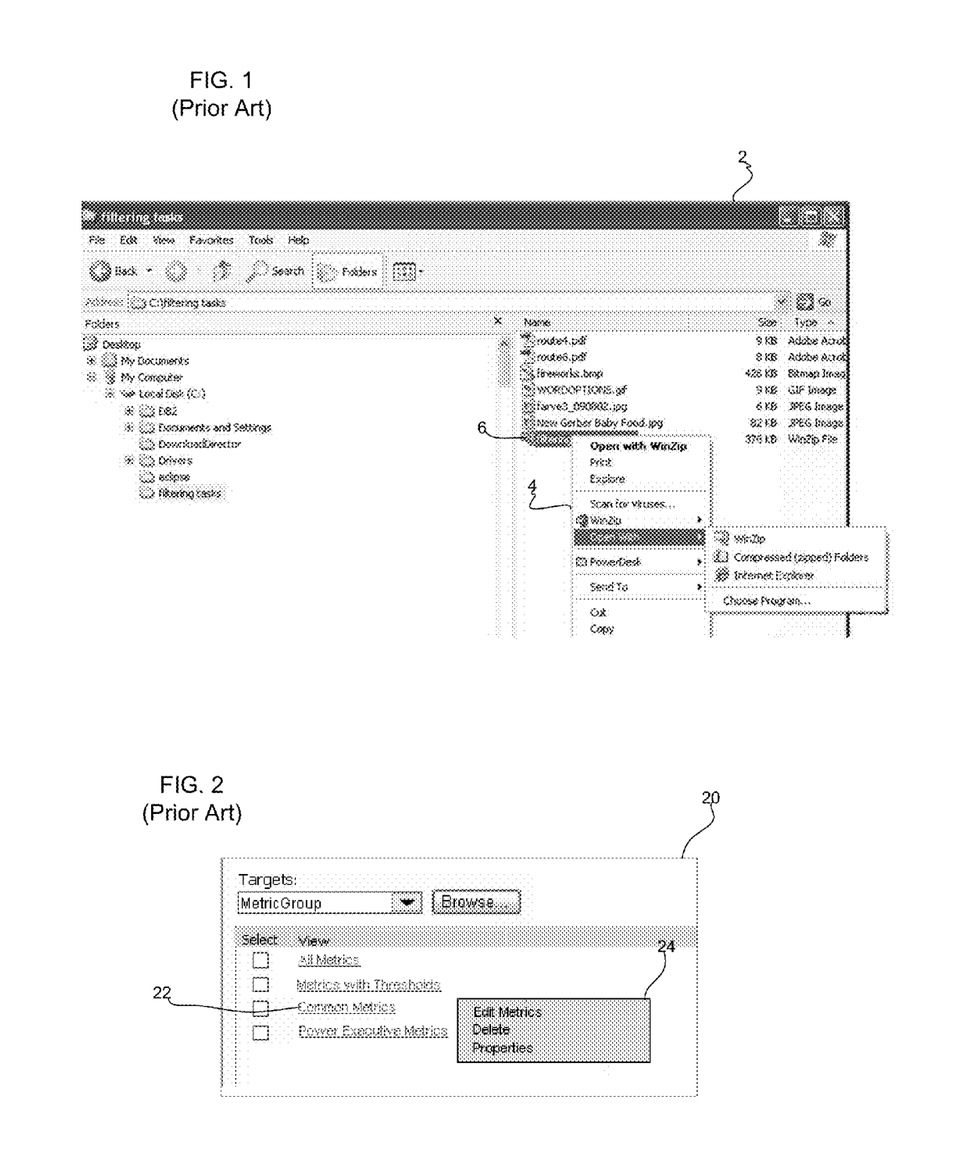
FIGS. 1 and 2 illustrate prior art implementations of graphical user interfaces for rendering information on composite objects.

When presented with a composite object, user interfaces present tasks that may be performed with respect to the composite object, but not for the component objects within the composite object. A user typically must expand a composite object (e.g., a ZIP file) before being presented with a list of targets or tasks that could be bound to one or more of the component objects. FIG. 1 illustrates a prior art graphical user interface (GUI) 2 displaying a context menu 4 for a selected ZIP file that shows tasks to operate on the ZIP file 6. FIG. 2 illustrates a prior art implementation of a GUI 20 displayed for a composite object comprising a metric group having common component metrics comprising measurements of system output, such as performance, utilization, etc. A context menu 24 displays application tasks relevant to a composite object of metrics, such as "Common Metrics" 22.

There is a need in the art for an improved technique for providing information on a composite object and its component objects and utilizing such information when managing a composite object and component objects grouped therein.

SUMMARY

Provided are a method, system, and article of manufacture for generating information on application tasks for component objects grouped in a composite object. A composite object in a computer readable medium is comprised of component objects, wherein different application tasks are used to process the component objects. Metadata associates the application tasks for the component objects grouped in the composite object with the composite object. An operation is performed on the composite object by processing the metadata indicating the application tasks for the component objects grouped in the composite object on which the operation is performed.

DETAILED DESCRIPTION

Figure 3:
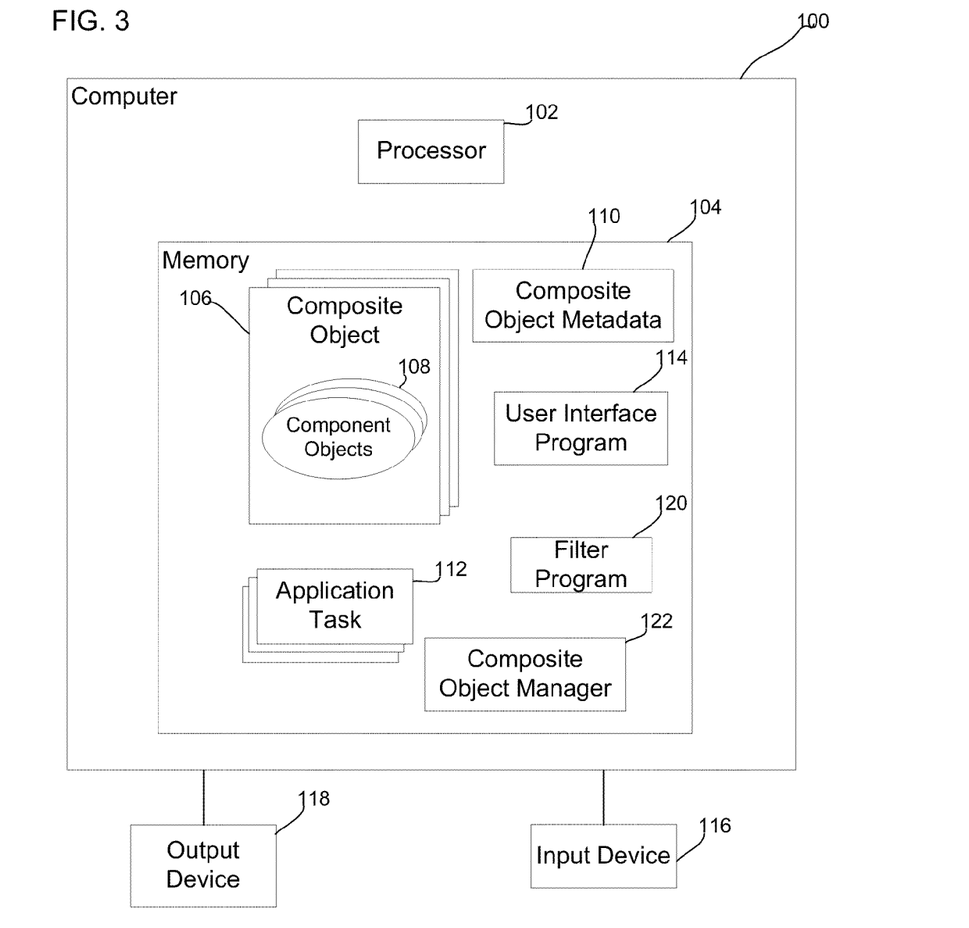
FIG. 3 illustrates an embodiment of a computing environment.

FIG. 3 illustrates a computing environment in which aspects of the invention are implemented. A computer 100 includes one or more processors 102 and a computer readable memory 104 in which programs and data are loaded for execution by the processor 102. The memory 104 includes one or more composite objects 106, where a composite object includes one or more component objects 108 and composite object metadata 110 providing information on one or more application tasks 112 associated with each component object 108. The composite object metadata 110 may be maintained within the composite object 106 or external thereto. Each application task 112 associated with a component object 108 is executed by the processor 102 to perform an operation with respect to the component object 108. Further, there may be one or more application tasks 112 that perform operations with respect to one composite object 106, such as add and delete component objects 108 from the composite object 106 or specify properties for the composite object 106, such as a password, compression ratio, compression type, etc.

A composite object 106 may comprise a file including the component objects 108, which themselves comprise files contained within the composite object 106, such as the case with a composite file including multiple objects, e.g., a ZIP file, database file, etc. Alternatively, the composite object 106 may group metrics, wherein the component objects 108 comprise metrics. Each component metric comprises a measurement of output of a computer system, such as the temperature, performance, utilization, etc. of components in the system, such as the processor, memory, storage drives, power supply, data interfaces, overall system, etc. The application tasks 112 associated with the component metrics generate the metrics and perform operations with respect to the metrics. Component objects 108 may be stored within the composite object 106 data structure. In an alternative embodiment, the component objects 108 may be stored externally to the composite object 106 and the composite object 106 maintains information grouping the component objects 108 associated with the composite object.

A user interface program 114, in response to user input received via an input device 116 (e.g., a mouse, keyboard, pen stylus, microphone, touch screen, etc.), processes the composite metadata 110 to provide information in a menu or other user interface graphical element on application tasks 112 associated with the component objects 108 of a selected composite object 106. The user interface program 114 may render an interface to the application tasks 112 associated with the component objects 108 of a selected composite object 106 on an output device 118 (e.g., a computer monitor) to enable a user using the input device 116 to select an application task 112 to invoke to process a component object 108 shown in the composite object 106.

A filter program 120 may be used to generate a filter identifying one or more application tasks 112 and process information on the composite objects 106 to determine any composite objects 106 that include component objects 108 associated with application tasks identified in the filter. The filter program 120 may present to the user those composite objects 106 having component objects 108 associated with application tasks identified in the filter.

A composite object manager 122 may generate the composite object metadata 110 and perform operations in response to user input to create composite objects 106, e.g., add and delete the component objects 106 grouped by the composite object 106, and perform other composite object management related operations.

Figure 4:
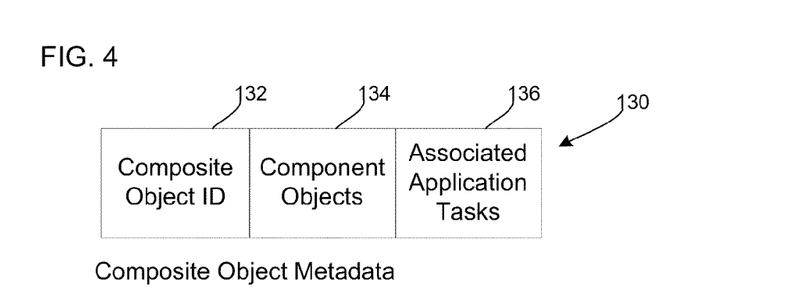
FIG. 4 illustrates an embodiment of composite object metadata.

FIG. 4 illustrates an embodiment of composite object metadata 130 for a composite object 106, comprising an instance of the composite object metadata 110 for one composite object 106, including a composite object identifier (ID) 132, indication of component objects 134 grouped by the composite object 132, and associated application tasks 136 associated with the component objects 134.

Figure 5:
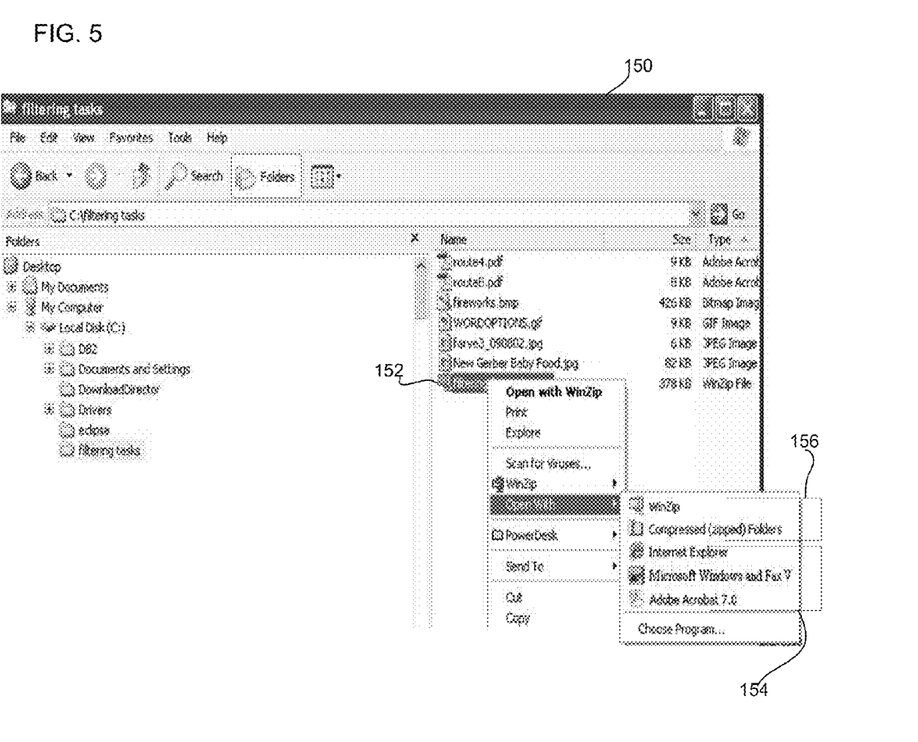
FIGS. 5 and 6 illustrate embodiments of graphical user interfaces for rendering information on composite objects and the application tasks associated with component objects grouped in the composite object.

FIG. 5 illustrates an embodiment of a graphical user interface (GUI) 150 rendered in the output device 118 showing a composite object 152 comprising a ZIP file. Upon selection of the composite object 152 with a user interface control, the user interface program 114 generates indication of application tasks 154 capable of processing component objects 108 in the selected composite object 152 and application tasks 156 associated with the composite object 152. In this way, the user interface program 114 provides the user information on all application tasks 154, 156 associated with component objects 108 and the composite object 106.

Figure 6:
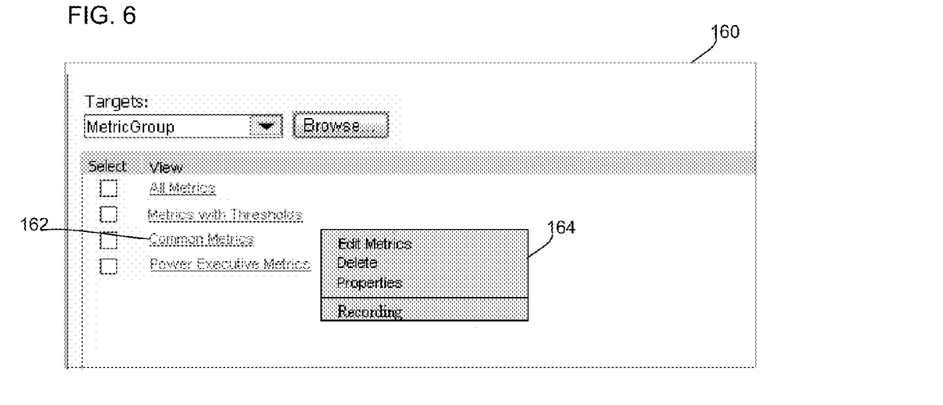

FIG. 6 illustrates an embodiment of a GUI 160 showing composite objects 160, wherein selection of one composite object called "Common Metrics" 162 displays a user interface of application tasks 164 capable of processing component objects in the composite object 162, such as the "Recording" task which records metrics over time, and performing operations with respect to the composite object 162 itself, e.g., edit and delete metrics and configure properties for the composite object.

In the GUI examples of FIGS. 5 and 6, the user is presented with a list of application tasks associated with the component objects 108 of the composite object 106, in addition to the application tasks associated with the composite object to determine and provide the capability to invoke application resources applicable to the composite object 108.

Figure 7:
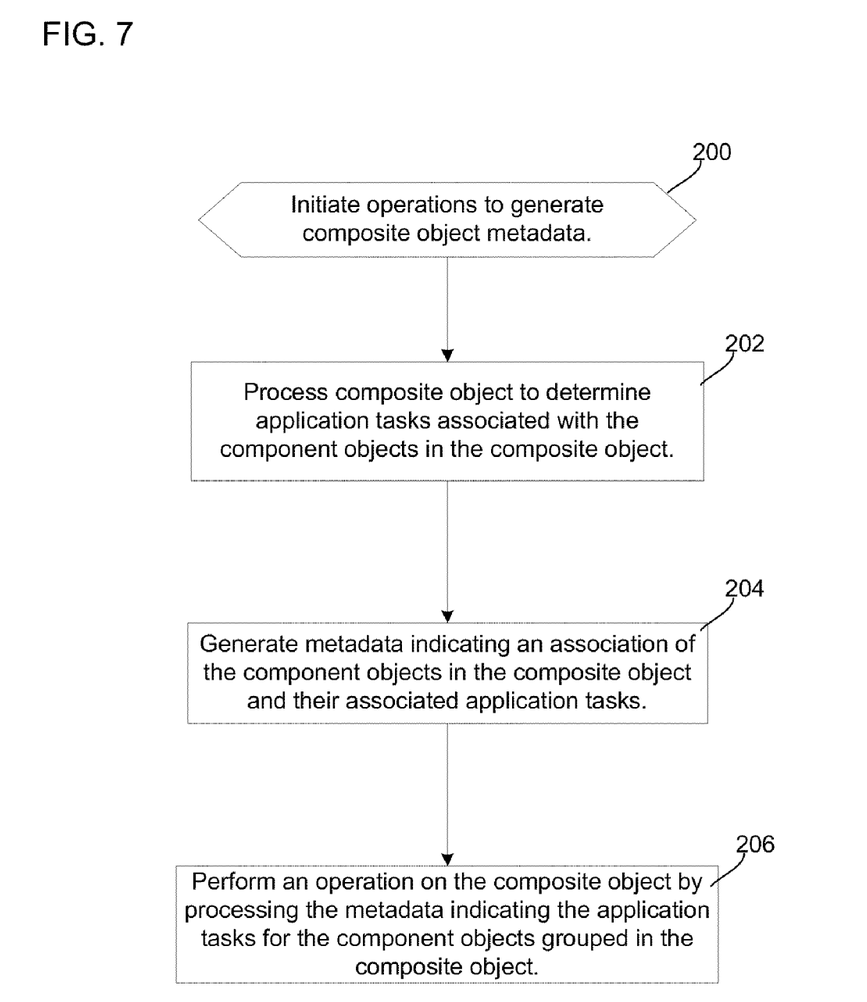
FIG. 7 illustrates an embodiment of operations to generate composite object metadata.

FIG. 7 illustrates an embodiment of operations performed by a composite object manager 122 to generate composite object metadata 110. Upon initiating (at block 200) operations to generate the composite object metadata 110, the composite object manager 122 processes (at block 202) a composite object 106 to determine application tasks 112 associated with the component objects 108 in the composite object 106. The composite object manager 122 generates (at block 204) metadata 130 (FIG. 4) indicating an association of the component objects 134 in the composite object 132 and their associated application tasks 136. An application, such as the component object manager 122, user interface program 114 and filter program 120 may perform (at block 206) an operation on the composite object 106 by processing the metadata 130 indicating the application tasks 136 for the component objects 134 grouped in the composite object 132.

Figure 8:
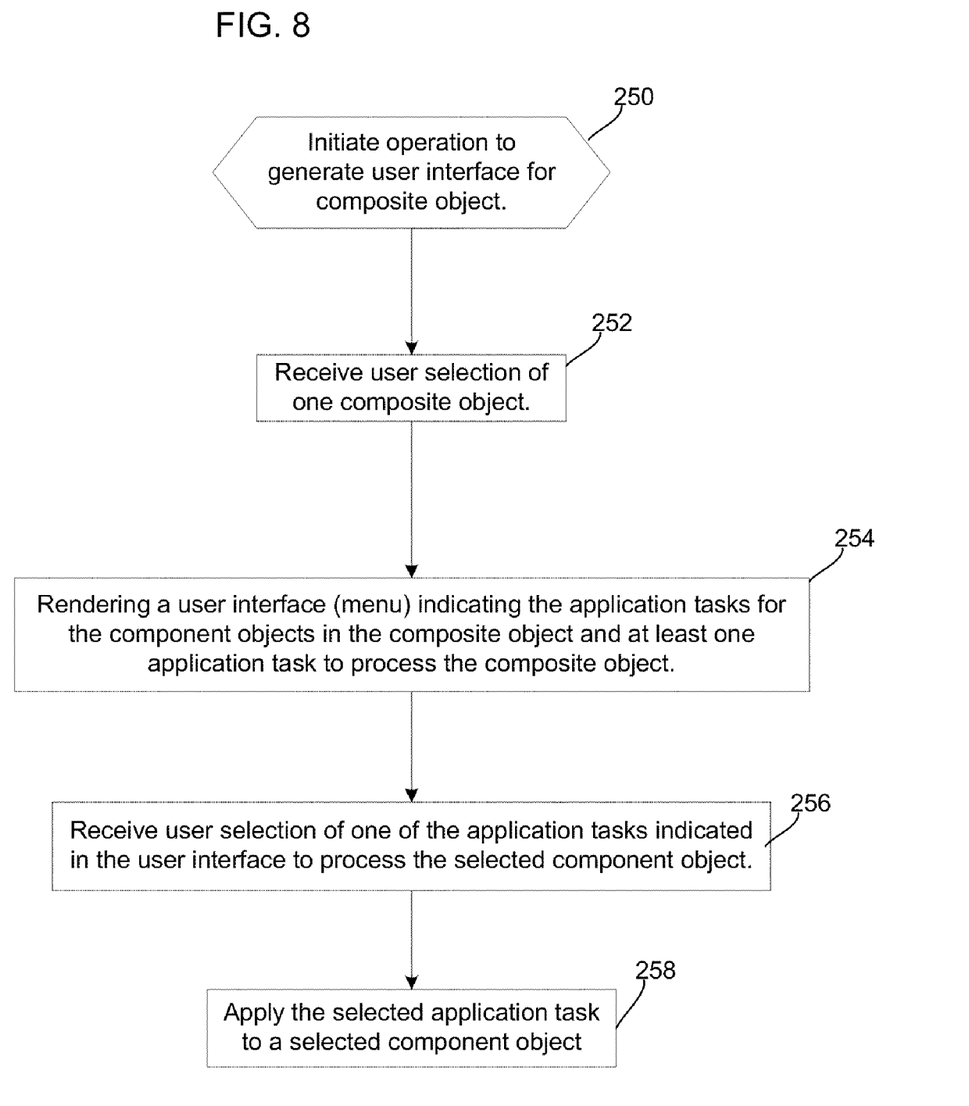
FIG. 8 illustrates an embodiment of operations to generate a user interface for a composite object.

FIG. 8 illustrates an embodiment of operations performed by the user interface program 114 to render information on a selected composite object 108. Upon initiating (at block 250) operations to generate a user interface, such as shown in FIGS. 5 and 6, the user interface program 114 receives (at block 252) user selection of one composite object 108. The user interface program 114 renders (at block 254) a user interface (e.g., context menu) indicating the application tasks 112 for the component objects 108 in the selected composite object 106 and at least one application task 112 to process the composite object 106. The user interface program 114 may further receive (at block 256) user selection of one of the application tasks 112 indicated in the user interface to process the selected component object 108 or composite object 106. The selected application task 112 may then be applied (at block 258) to a selected component object 108 or composite object 106.

Figure 9:
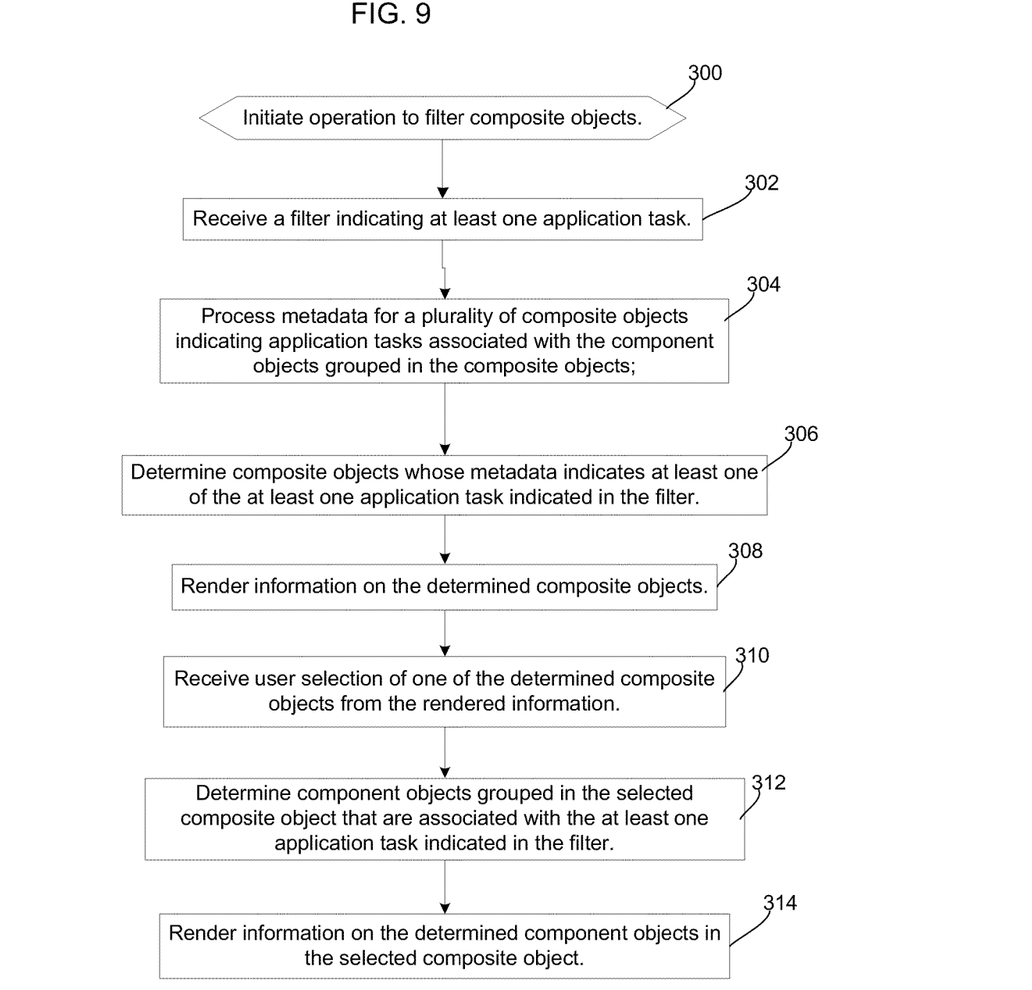
FIG. 9 illustrates an embodiment of operations to filter composite objects.

FIG. 9 illustrates an embodiment of operations performed by the filter program 120 to filter composite objects 106 based on application tasks 112. Upon initiating (at block 300) an operation to filter composite objects 106, the filter program 120 receives (at block 302) a filter indicating at least one application task 112 for component objects. The filter program 12 processes (at block 304) metadata 110 for a plurality of composite objects indicating application tasks 112 associated with the component objects grouped in the processed composite objects 106. A determination is made (at block 306) of composite objects 106 whose metadata 110 indicates at least one of the at least one application task indicated in the filter. The filter program 120 renders (at block 308) information on the determined composite objects 106. Those composite objects 106 not having one of the application tasks indicated in the filter may be hidden from the list of rendered component objects in the user interface.

The filter program 114 may further receive (at block 310) user selection of one of the determined composite objects from the rendered information and determine (at block 312) component objects 108 grouped in the selected composite object 106 that are associated with the at least one application task indicated in the filter. Information on the determined component objects 108 in the selected composite object 108 may then be rendered (at block 314) in a user interface on the output device 118.

Figure 10:
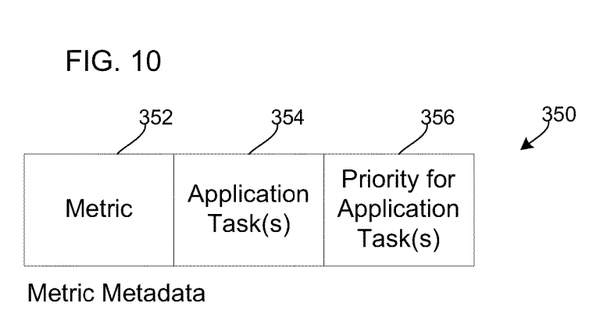
FIG. 10 illustrates an embodiment of metric metadata for a metric related composite object.

FIG. 10 illustrates an embodiment of metric metadata 350 having priority information for application tasks 112 to use to process the metric if there are multiple application tasks 356 (FIG. 10) for the component objects 108 in the composite object 106. The metric metadata 350 identifies the metric 352 (i.e., component object), indicates the application tasks 354 associated with that metric 354 and the priority 356 in which the application tasks 354 are invoked to process the metric 352.

Figure 11:
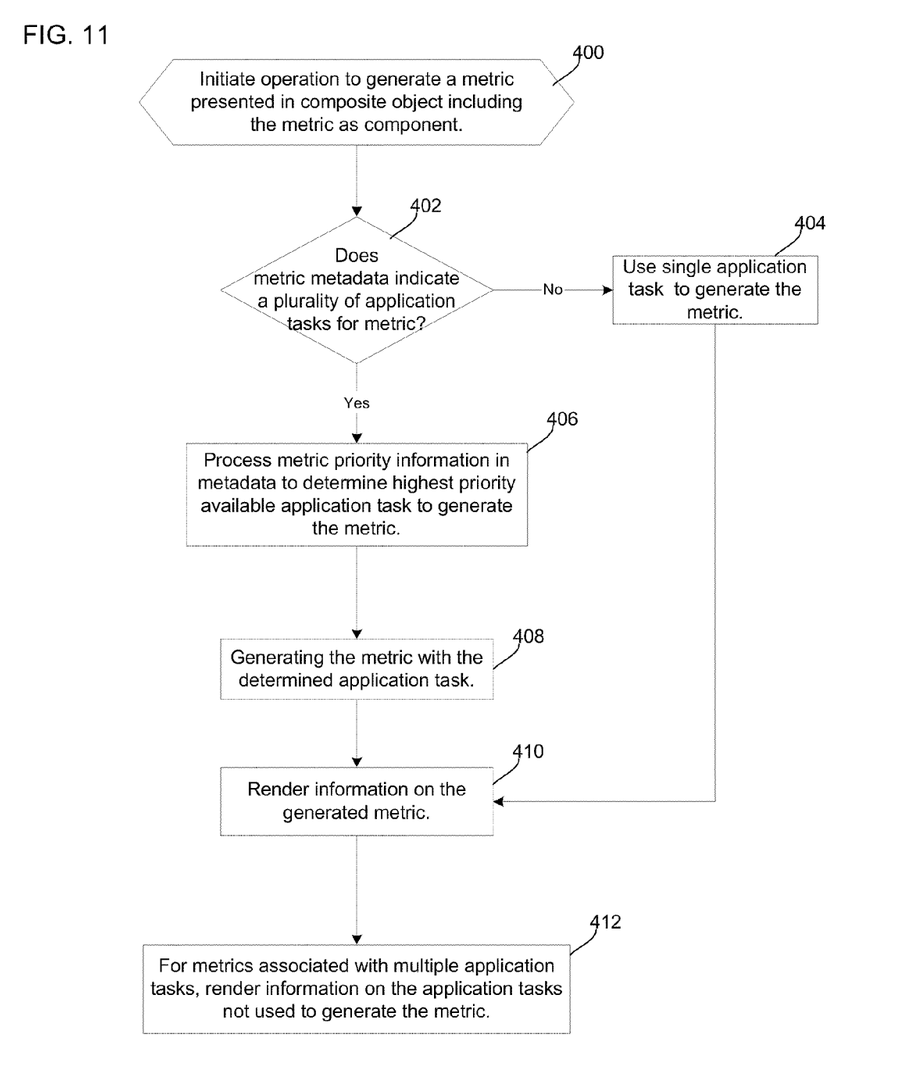
FIG. 11 illustrates an embodiment of operations to generate a metric within a composite object.

FIG. 11 illustrates an embodiment of operations performed by the composite object manager 122 to generate metrics, i.e., the component objects 108, in a composite object 106. Upon initiating (at block 400) the operation to generate a metric presented in a composite object 106 comprised of metrics, the composite object manager 122 determines (at block 402) whether the metric metadata 350 for a metric to generate indicates in field 354 (FIG. 10) a plurality of application tasks 112. If not, then the single application task 112, indicated in field 354, associated with the metric is invoked (at block 404) to generate the metric in the composite object 106. If (at block 402) there are a plurality of application tasks 112 for the metric 108, indicated in field 354, then the composite object manager 122 processes (at block 406) the metric priority information 356 to determine a highest priority available application task 112 to generate the metric. The metric, such as the temperature, performance information, utilization information, etc., is generated (at block 408). Information on the generated metric is rendered (at block 410). Further, for metrics associated with multiple application tasks 112, the composite object manager 122 may render (at block 410) information on the application tasks not used to generate the metric, such as indicate the application tasks not used, indicate the value they produce, etc.

Described embodiments provide techniques to determine and render information on application tasks associated with component objects grouped by a composite object to allow the user to perform operations with respect to the component objects, such as filter the object, render information on the application tasks for component object in a user interface for selection, etc. Further embodiments, allow the assignment of a priority to each of multiple application tasks that may be used to process or generate a component object, such that a highest priority available application task may be used to generate the component object in the composite object, such as to generate metrics within a composite object that groups metrics.

Additional Embodiment Details

The described operations may be implemented as a method, apparatus or article of manufacture using standard programming and/or engineering techniques to produce software, firmware, hardware, or any combination thereof. The described operations may be implemented as code maintained in a "computer readable storage medium", where a processor may read and execute the code from the computer storage readable medium. A computer readable storage medium may comprise storage media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic implemented in a hardware device (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The "article of manufacture" may comprise a transmitting station and/or a receiving station for transmitting and receiving transmission signals in which the code or logic is encoded, where the code or logic encoded in the transmission signal may be decoded and stored in hardware or a computer readable storage medium at the receiving and transmitting stations or devices. An "article of manufacture" comprises a device, such as a computer readable storage medium, hardware device, and/or transmission transmitters or receivers in which code or logic may be implemented. Those skilled in the art will recognize that many modifications may be made to this configuration without departing from the scope of the present invention, and that the article of manufacture may comprise suitable information bearing medium known in the art.

In the described embodiments, the access parameters are changed for process accesses to memory addresses in a shared memory. In an alternative embodiment, access patterns may be monitored for computer resources other than memory addresses, such as addresses in a storage device and other computer resources.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 7, 8, 9, and 11 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching.

It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
providing a composite object in a computer readable medium comprised of component objects, wherein different application tasks are used to process the component objects;
providing metadata associating the application tasks for the component objects grouped in the composite object with the composite object, wherein at least two of the composite objects have different types of component objects each having different instances of metadata indicating different application tasks to process the different types of component objects in the at least two composite objects;
processing the metadata, indicating the application tasks for the component objects grouped in the composite object, to render a user interface for the composite object rendering an indication of application tasks used to process the component objects in the composite object;
receiving a filter indicating at least one application task;
processing the metadata for the composite objects indicating the application tasks associated with the component objects grouped in the composite objects;
determining the composite objects whose metadata indicates at least one of the application tasks indicated in the filter;
rendering information on the determined composite objects;
receiving user selection of one of the determined composite objects from the rendered information;
determining component objects grouped in the selected composite object that are associated with the at least one application task indicated in the filter; and
rendering information on the determined component objects in the selected composite object.

2. The method of claim 1, wherein there is at least one application task used to process the composite object, wherein rendering the user interface further comprises indicating the at least one application task to process the composite object.

3. The method of claim 1, further comprise:
receiving user selection of the composite object; and
rendering the user interface indicating the application tasks for the component objects in the selected composite object in response to receiving the selection of the composite object.

4. The method of claim 3, further comprising:
receiving user selection of one of the application tasks indicated in the user interface to process the selected component object; and
applying the selected application task to the selected component object.

5. The method of claim 1, wherein the composite object comprises a container and the component objects comprise files generated by different applications comprising different file types stored within the composite object.

6. The method of claim 1, wherein the composite object groups metrics, wherein the component objects comprise metrics, wherein each metric comprises a measurement of output of a computer system, wherein the application tasks associated with the metrics generate the metrics and perform operations with respect to the metrics.

7. The method of claim 6, wherein at least one of the metrics is associated with a plurality of application tasks, wherein each of the application tasks associated with one of the metrics is executable to generate the metric, further comprising:
providing a priority for application tasks associated with one metric indicating an order in which the application tasks are selected to generate the metric in the composite object.

8. The method of claim 7, wherein only one of the plurality of application tasks associated with the metric are selected to generate the metric according to the priority for the application tasks, further comprising:
rendering information on the metrics generated by the application tasks associated with the metrics.

9. The method of claim 8, wherein rendering the information further comprises:
for metrics associated with multiple application tasks, rendering information on the application tasks not used to generate the metric with the rendered information on the metric.

10. A system, comprising:
a processor;
a computer readable medium including a composite object comprised of component objects, application tasks, wherein different application tasks are used to process the component objects, and metadata associating the application tasks for the component objects grouped in the composite object with the composite object, wherein at least two of the composite objects have different types of component objects each having different instances of metadata indicating different application tasks to process the different types of component objects in the at least two composite objects; and
a program included in the computer readable medium executed by the processor to:
process the metadata, indicating the application tasks for the component objects grouped in the composite object, to render a user interface for the composite object rendering an indication of application tasks used to process the component objects in the composite object;
receiving a filter indicating at least one application task;
processing the metadata for the composite objects indicating the application tasks associated with the component objects grouped in the composite objects;
determining the composite objects whose metadata indicates at least one of the application tasks indicated in the filter;
rendering information on the determined composite objects;
receiving user selection of one of the determined composite objects from the rendered information;
determining component objects grouped in the selected composite object that are associated with the at least one application task indicated in the filter; and
rendering information on the determined component objects in the selected composite object.

11. The system of claim 10, wherein the composite object groups metrics, wherein the component objects comprise metrics, wherein each metric comprises a measurement of output of a computer system, wherein the application tasks associated with the metrics generate the metrics and perform operations with respect to the metrics.

12. The system of claim 10, wherein there is at least one application task used to process the composite object, wherein rendering the user interface further comprises indicating the at least one application task to process the composite object.

13. An article of manufacture comprising a computer readable storage medium having code executed to communicate with a computer readable medium and causing operations, the operations comprising:
 providing a composite object in the computer readable medium comprised of component objects, wherein different application tasks are used to process the component objects;
 providing metadata associating the application tasks for the component objects grouped in the composite object with the composite object, wherein at least two of the composite objects have different types of component objects each having different instances of metadata indicating different application tasks to process the different types of component objects in the at least two composite objects;
 processing the metadata, indicating the application tasks for the component objects grouped in the composite object, to render a user interface for the composite object rendering an indication of application tasks used to process the component objects in the composite object;
 receiving a filter indicating at least one application task;
 processing the metadata for the composite objects indicating the application tasks associated with the component objects grouped in the composite objects;
 determining the composite objects whose metadata indicates at least one of the application tasks indicated in the filter;
 rendering information on the determined composite objects;
 receiving user selection of one of the determined composite objects from the rendered information;
 determining component objects grouped in the selected composite object that are associated with the at least one application task indicated in the filter; and
 rendering information on the determined component objects in the selected composite object.

14. The article of manufacture of claim 13, wherein the composite object groups metrics, wherein the component objects comprise metrics, wherein each metric comprises a measurement of output of a computer system, wherein the application tasks associated with the metrics generate the metrics and perform operations with respect to the metrics.

15. The article of manufacture of claim 13, wherein there is at least one application task used to process the composite object, wherein rendering the user interface further comprises indicating the at least one application task to process the composite object.

16. The article of manufacture of claim 13, wherein the operations further comprise:
 receiving user selection of the composite object; and
 rendering the user interface indicating the application tasks for the component objects in the selected composite object in response to receiving the selection of the composite object.

* * * * *